United States Patent Office 2,762,822
Patented Sept. 11, 1956

2,762,822

COPPER NITROGENOUS ORGANIC COMPOUND

Harold N. Vagenius, Berwyn, Ill.

No Drawing. Application March 4, 1954,
Serial No. 414,229

5 Claims. (Cl. 260—438)

This invention relates to compounds including copper together with a gluconate and an amino benzoic acid radical, specifically, the para amino benzoic acid radical. The invention also pertains to deodorizing, enzyme inhibition and bactericidal action effected by the use of the said compounds.

The compounds of the present invention may be prepared by several methods. One method involves a reaction between copper gluconate and an alkali metal salt of an amino benzoic acid (such as the sodium, potassium or lithium salt). Each reagent is dissolved in water. One molecule of copper gluconate then reacts with one molecule of the amino acid salt to form a copper compound containing both a gluconate and an amino benzoic acid radical. This compound is insoluble in water at neutral or acid pH values and is therefore precipitated when the solutions of the two reagents are mixed. The compound may therefore be filtered off, washed with water and dried.

Another method of preparing the compounds of the present invention involves a reaction between one molecule of an alkali metal gluconate (such as the sodium, potassium or lithium gluconate), one molecule of a soluble copper salt (such as the sulfate, chloride or bromide) and one molecule of an alkali metal amino benzoate). Aqueous solutions of the three reagents are mixed together. If the resulting mixture is neutral or acid, the compound then formed is precipitated. If the mixture is alkaline (pH 7.5 or higher) the compound remains in solution.

A third method of preparing the compounds of this invention involves a reaction between copper amino benzoate and an alkali metal gluconate (such as the sodium, potassium or lithium gluconate). The copper amino benzoate (prepared by a reaction between aqueous solutions of a soluble copper salt and an alkali metal amino benzoate) is suspended in an alkaline aqueous solution of the alkali metal gluconate. The reagents are employed in molecular proportions. Although the alkali metal gluconate solutions are naturally alkaline, it is preferred to add a small amount of an alkali metal hydroxide (such as the sodium, potassium or lithium hydroxides) to the reaction mixture to raise the pH thereof, for instance, to 9 or 10. The copper amino benzoate dissolves in the reaction mixture, a new compound according to the present invention being formed which, if desired may be isolated by acidifying the reaction mixture (for instance, with hydrochloric acid), filtering off the then precipitated compound, washing the compound with water and drying the same.

The amino benzoates referred to above may be the para, meta or ortho isomers.

*Example 1*

5.6 grams para amino benzoic acid and 8.8 grams sodium gluconate are dissolved in 100 ml. water to which 40 ml. of 5% sodium hydroxide solution has been added.
6.8 grams cupric chloride is dissolved in 25 ml. water.

The two solutions are mixed. The resulting precipitate of the new compound is filtered off, washed with water and dried.

Alternately, the precipitate may be dissolved by adding to the reaction mixture 53 ml. of 5% sodium hydroxide solution, which raises the pH to 9.4. As much as 25 ml. of 1% hydrochloric acid (which reduces the pH to 8.2) may be added without precipitating the new compound. Further acidification causes precipitation of the new compound.

5.6 grams of the ortho and meta amino benzoic acids have each been substituted for the para amino benzoic acid, to prepare the corresponding compounds of these two amino benzoic acids.

*Example 2*

5.6 grams para amino benzoic acid is dissolved in 25 ml. water to which 40 ml. of 5% sodium hydroxide has been added.
18 grams copper gluconate is dissolved in 100 ml. water.
The two solutions are mixed. The resulting precipitate of the new compound is filtered off, washed with water and dried.

Alternately, the precipitate may be dissolved by adding to the reaction mixture 47 ml. of 5% sodium hydroxide solution, which raises the pH to 7.7.

5.6 grams of the ortho and meta amino benzoic acids have each been substituted for the para amino benzoic acid, to prepare the corresponding compounds of these two amino benzoic acids.

*Example 3*

5.6 grams para amino benzoic acid and 17.6 grams sodium gluconate are dissolved in 75 ml. water to which 82 ml. of 5% sodium hydroxide solution has been added.
6.8 grams cupric chloride is dissolved in 50 ml. water.
The two solutions are mixed, to form a solution of the new compound having a pH of 7.9. The new compound may be precipitated by acidifying the solution with dilute hydrochloric acid.

5.6 grams of the ortho and meta amino benzoic acids have each been substituted for the para amino benzoic acid, to prepare the corresponding compounds of these two amino benzoic acids.

*Example 4*

24 grams of the copper salt of para amino benzoic acid (prepared by a reaction between aqueous solutions of sodium para amino benzoate and copper sulfate) are suspended in a solution of 45 grams of sodium gluconate in 1000 ml. water. Enough sodium hydroxide is added to raise the pH to 9.0. The mixture is stirred and heated gently until the copper amino benzoate is dissolved, to form a solution of the new compound, which may be precipitated by acidifying the solution with dilute hydrochloric acid.

24 grams of the ortho and meta amino benzoic acid copper salts have each been substituted for the copper salt of the para amino benzoic acid, to prepare the corresponding compounds of these two amino benzoic acids.

Solutions of the copper gluconate-amino benzoate compounds of the present invention are useful in many fields, as disclosed hereinbelow.

Solutions having a concentration upwards of 0.2 per cent (0.5 to 5% concentration being preferred) are excellent germicides, which may be used to treat surgical bandages, and catamenial bandages. The same solutions are also powerful deodorants, being capable of eliminating, for instance, garlic and onion odors from objects contaminated by such odors.

The same solutions may be used to treat woolen textiles (by immersion for 2 to 10 minutes followed by rinsing with water) to make such fabrics resistant to odor development. Fabrics so treated (for instance, socks) will not exhibit perspiration odor when worn next to the skin, and this deodorizing property persists even after the fabrics have been washed with soap or detergents.

The compounds of this invention when added to carbohydrates at 0.1 to 5% concentration will prevent acid-forming decomposition thereof.

The compounds of this invention have been incorporated (at 0.2 to 5% concentration) with cosmetic creams, which when applied to the arm pits prevent the development of perspiration odors. When incorporated at the same concentration with mouth washes or toothpastes, the compounds eliminate and prevent the further development of unpleasant mouth odors.

Solutions of the compounds of this invention (at concentrations of from 0.2 to 5%) are useful in connection with hair waving effected with ammonium thioglycollate solutions. The solutions of the compounds of this invention will instantly deodorize the hair and skin contacted with the hair waving solution, and the odor will not again reappear when the hair (after having been dried) is again wetted with hot water, even when the hair has been rinsed and/or washed thoroughly after application of the solution of the compounds of this solution.

Many details may be varied without departing from the principles of this development. It is therefore not my purpose to limit the patent granted on this invention otherwise than necessitated by the scope of the appended claims.

I claim:
1. A copper compound containing both a gluconate and an amino benzoate radical, the said compound being a reaction product of copper and alkali metal salts of gluconic acid and of an aminobenzoic acid.
2. The compound of claim 1 in which said amino benzoate radical is the para isomer.
3. The compound of claim 1 in which said amino benzoate radical is the meta isomer.
4. The compound of claim 1 in which said amino benzoate radical is the ortho isomer.
5. An aqueous solution of the compound of claim 1.

References Cited in the file of this patent
UNITED STATES PATENTS 2,152,248    Finkelztejn ---------------- Mar. 28, 1939
2,413,627    Hestis et al. --------------- Dec. 31, 1946

OTHER REFERENCES

Hilfer: Drug & Cosmetic Industry, vol. 63, December 1948, pages 736, 737.

American Perfumer & Essential Oil Review, vol. 61, April 1954, pages 269, 271.